July 14, 1942.   W. P. NIBLICK   2,289,381
MOTION TRANSLATING APPARATUS
Filed Nov. 16, 1938   2 Sheets-Sheet 1
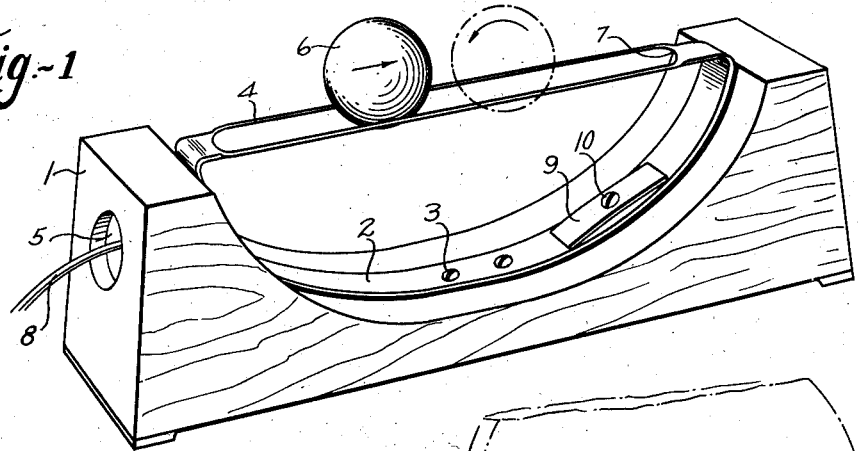
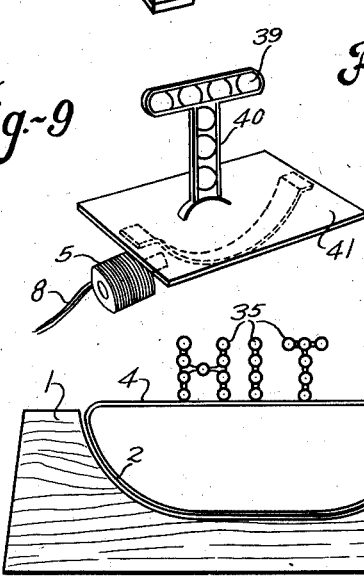
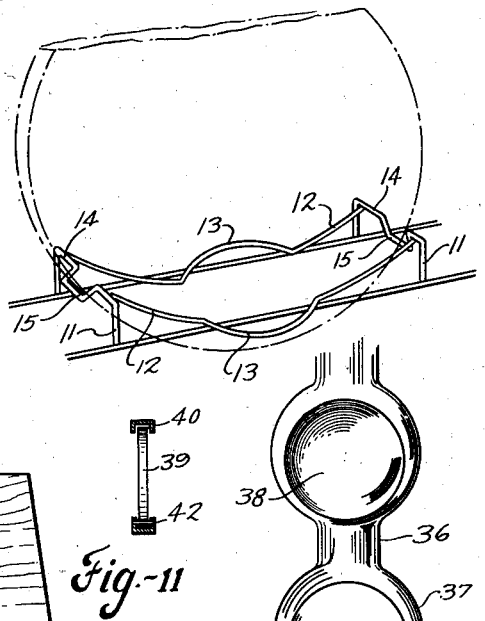
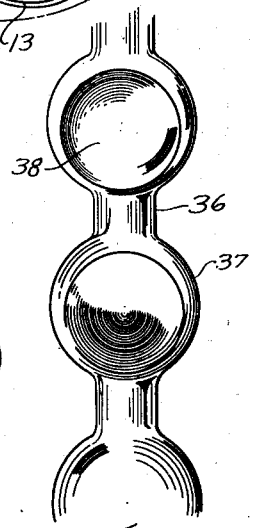
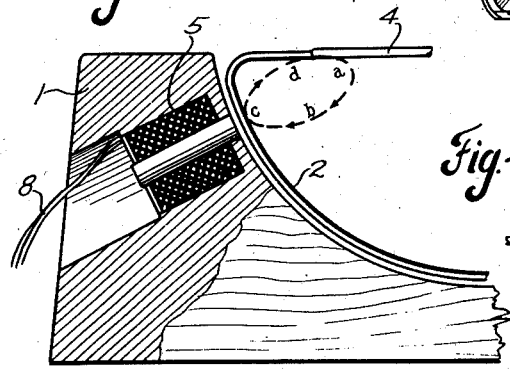
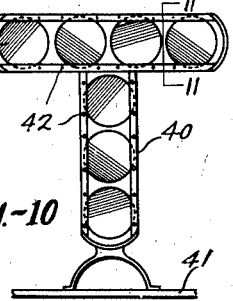

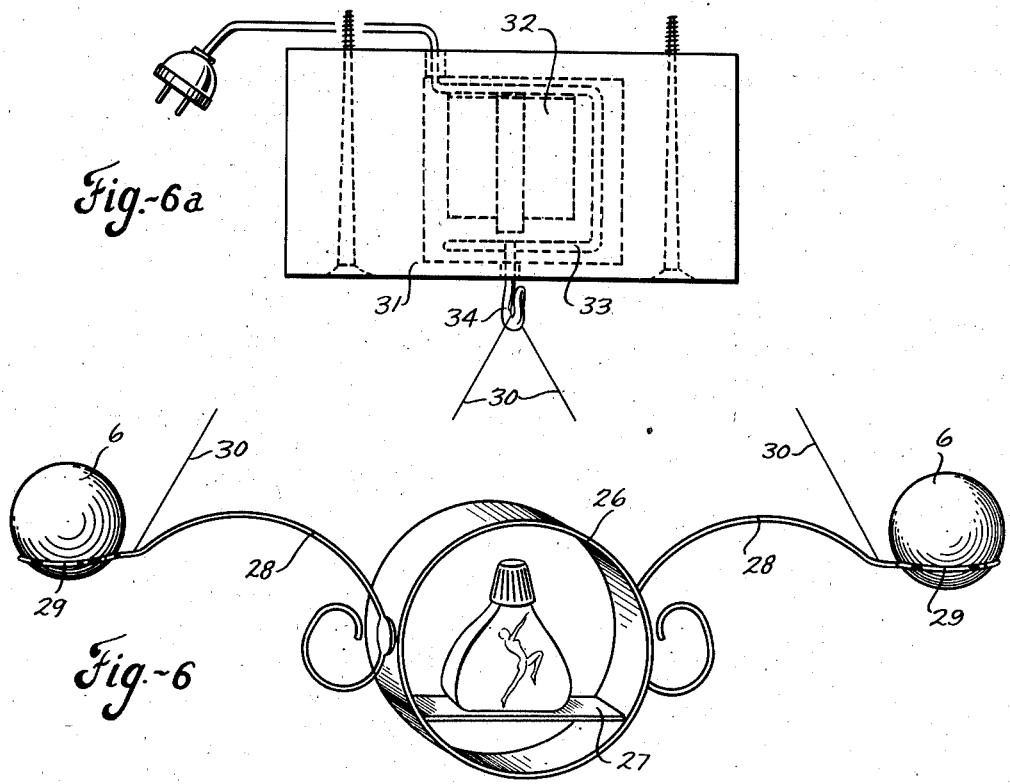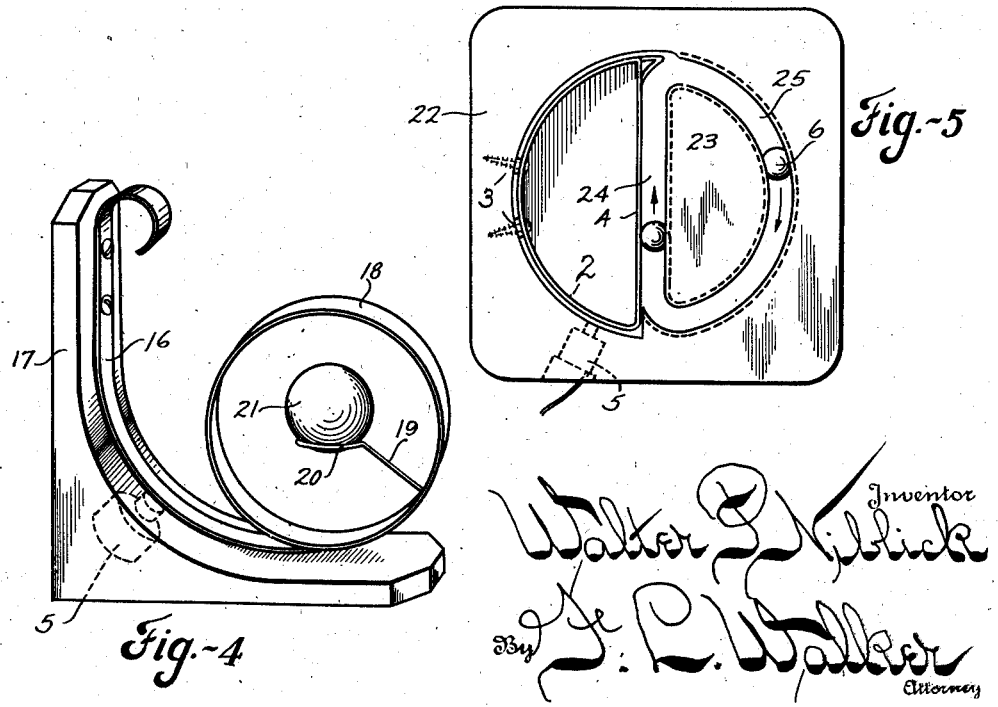

Patented July 14, 1942

2,289,381

UNITED STATES PATENT OFFICE 2,289,381

MOTION TRANSLATING APPARATUS

Walter P. Niblick, Dayton, Ohio

Application November 16, 1938, Serial No. 240,737

9 Claims. (Cl. 40—139)

This invention pertains to a vibratory motion transmitting apparatus, and more particularly to a means and mode of translating to and fro vibratory impulses into rotary motion.

One of the characteristics of the present invention is the absence of any visible actuation of the driven rotating body and an appearance of mystery in its operation. Such characteristics make the device especially desirable for advertising purposes as a means of attracting attention to merchandise displays known as a "window stopper."

For illustrative purposes, but with no intent to unduly limit the scope or application of the invention, it is herein shown and described in several forms of embodiment suitable for such attention attracting or "window stopping" purpose. It is to be understood, however, that it is not limited thereto but may be applied to various other motion transmitting purposes, as, for example, to toys and mechanical and scientific apparatus wherein it is desired to impart a slowly rotating motion to an actuated member. The invention is also applicable to animated signs and figures.

The object of the invention is to provide a vibratory motion transmitting means which may not only be economically manufactured but will be effective in use, automatic in operation, uniform in action, of relatively few operating parts, and unlikely to get out of order.

A further and important object of the invention is to provide a motion transmitting apparatus wherein the mode of operation will not be readily apparent and wherein there will be an air of mystery sufficient to arouse curiosity of observers and attract attention to the device and its operation.

A further object of the invention is to provide means for inducing either rotary motion of a driven body about its own axis or alternatively travel motion through a prescribed path of travel by transmittting thereto a succession of vibratory impulses.

A further object of the invention is to provide a mode of operation for actuating a rotary body wherein the actuation thereof will be invisible to the ordinary observer and such as to create an air of mystery and arouse curiosity as to the means of actuation.

A further object of the invention is to provide animated signs and figures.

A further object of the invention is to provide a motion transmitting apparatus having the advantageous structural features and the inherent meritorious characteristics herein mentioned.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein are illustrated several effective but obviously not necessarily the only forms of embodiment of the invention, Fig. 1 is a perspective view of a simple form of the apparatus wherein a light weight ball is caused to progressively travel up an inclined track and roll back to the starting point for repetitious action.

Fig. 2 is a detail sectional view thereof.

Fig. 3 is a detail perspective view of an addition to the disclosure of Fig. 1 by which a disc, a cylinder or a sphere may be made to rotate about its own axis.

Fig. 4 is a perspective view of a somewhat different form of embodiment wherein a sphere is rotated about its center.

Fig. 5 is a front elevation of a further embodiment wherein a light ball is caused to climb vertically and then return to the bottom of its vertical path for repetition of its climbing action.

Figs. 6 and 6a illustrate a suspension form of embodiment of the invention wherein plural spheres are rotated simultaneously.

Figs. 7 and 8 illustrate the application of the invention to animated sign letters.

Fig. 9 is a further variation of a sign letter having rotary elements actuated by the herein motion transmitting method.

Fig. 10 is a front elevation of an animated sign character wherein rotary colored discs are employed.

Fig. 11 is a transverse detail sectional view thereof.

Like parts are indicated by similar characters of reference throughout the several views.

Referring to the drawings, and particularly Figs. 1 and 2, wherein the invention is illustrated in a very simple form, 1 is a concave support, ordinarily made of wood, but which may be of other material of pleasing appearance or ornamental character.

Within the concavity of the support 1 and medially secured by screws 3 is a bow spring 2 of metal, the ends of which are connected by parallel spaced wires 4 disposed as cords of the segmental arc defined by the bow spring 2. Embedded and wholly concealed within the support 1 adjacent to one free end of the bow spring 2 is a vibrating electromagnet 5, the pole of which is extended into proximate relation with the bow spring 2, but preferably not entirely through the supporting body 1. The electromagnet 5 being operated by 60 cycle A. C. current attracts and releases the bow spring at a rapid rate of ordinarily sixty impulses per second. The magnet 5 is disposed in a diagonal position on an inclined axis offset relative to the point 3 of attachment of the bow spring. Theoretically at least, the initial tendency of the magnet is to draw the end of the bow slightly downwardly and thence laterally in a downward diagonal direction. Upon release by the magnet the bow spring reacts upwardly and thence laterally in an upwardly diagonal direction. Such movement is diagrammatically illustrated in Fig. 2, wherein the bow spring 2 and cord 4 respond downwardly at $a$ under the initial magnetic attraction and thence laterally at $b$. Upon release the then tensioned bow spring reacts upwardly at $c$ and thence laterally at $d$ preparatory to the next cycle attraction of the magnet. It is the final lateral impulse $d$ which, being transmitted to a body upon the cord 4, effects movement thereof.

In Fig. 1 there is shown upon the parallel cord wires 4 a soft sponge rubber ball 6, preferably of variegated color design. The bow spring is so positioned that the parallel track or cord wires 4 are somewhat inclined. The ball 6 being disposed at the lower end of the inclined track wires 4, the successive impulses $c$—$d$ (Fig. 2) tend to move the ball up the incline. The inertia of the ball enables it to retain its successive gains. Before gravity overcomes the inertia of the advanced ball and before it can start to roll backwardly, it receives the succeeding forward impulse $d$. Under such successive impulses the ball will travel from the lower to the higher end of the inclined track wires 4, sometimes sliding, sometimes partially rotating, until it reaches the upper limit of the track wires 4. The contact of the advancing ball with the end 7 of the track arrests its advance and the slight reaction is sufficient to overcome the inertia and overbalance the influence of the motivating impulses. The ball then rolls by gravity from the upper to the lower limit of the track wires. Coming to rest after its rolling travel down the incline, the ball again starts its travel motion upwardly under influence of the vibratory impulses for repetition of the cycle. It moves slowly but steadily up the incline and rolls more rapidly down the incline in endless succession so long as the magnet is energized. Due to the slight degree and extreme rapidity of movement of the bow spring and cord wires 4, such vibration is not visible to an observer. In a window display the electric cord 8 supplying current to the magnet is concealed in the window dressing. There is, therefore, no apparent reason why the ball travels to and fro and the mystery of its movement adds to its attraction. The vibration of the bow spring 2 may be dampened to vary the rate of travel of the ball by an opposing clamp member 9 exerting greater or less stiffening pressure upon the interior of the bow spring by adjustment of a screw 10.

The vibratory motion transmitting action thus described may be applied in various ways to achieve rotary motion of different driven bodies. In Fig. 3 there is shown a bridge addition mounted on the parallel cords 4—4 for support of a disc, a cylinder, or a sphere. Such bridge addition comprises short uprights 11 fixedly secured to the parallel wires 4 and interconnected longitudinally of such cord wires by dependent arcuate wires 12 in the medial portions of which are outwardly curved segments 13. The uprights 11 are transversely interconnected by ties 14 having therein angular dependent bights 15. The construction is such that a cylindrical body resting transversely upon the long arcuate ties 12 will be rotated about its axis by the vibration of the bow spring 2. Such body may be made to travel a limited distance upon the arcuate ties 12, but as the gradient thereof increases, gravity overcomes the inertia of the body and it rolls back to the center of the bridge. A heavier cylindrical body will merely rotate about its own axis at the middle of the structure. In event a disc is to be rotated, such member, which may be of relatively large size, is rested within the terminal bights 15. The vibratory motion transmits thereto a rotary action upon the supporting bridge. Likewise, a sphere resting in the arcuate medial segments 13 receives the vibratory impulses and responds by rotation about its center relative to the support. There being no actuating means or impeller visible, the rotary motion effected appears quite mysterious to an observer.

Fig. 4 illustrates a different embodiment wherein an arcuate spring 16 is attached at its upper end to to upright support 17. An electromagnet 5 embedded and concealed within the support serves to vibrate the arcuate spring arm as before described. At its upper end the extremity of the spring arm is curled, merely for ornamental effect. Likewise, at its free end, the spring arm carries a relatively large ring 18 disposed in vertical plane, also for its ornamental effect and to heighten the mystery and further disguise the operation. Within the larger ring 18 there is supported on a radial stem 19 a smaller horizontally disposed ring 20 which supports a sphere 21 free to rotate thereon.

The sphere 21 may be a golf ball, or it may be a crystal ball or a large marble of distinctive color or a transparency. Whatever the character of the sphere or ball 21, the minute invisible vibration of the spring arm 16 will transmit thereto a continuous rotary motion.

As a further illustration in Fig. 5, the bow spring 2 and parallel cord wires 4—4 are shown housed within a circular opening in a supporting panel 22. Disposed also within the circular opening, in parallel spaced relation with the cord wires 4, is a solid segment 23. The margins of the segment 23 are slightly grooved, as is also the interior of the circular opening in the panel opposite the arcuate side of the segment, to form a retainer channel for a traveling ball.

The relative spacing of the segment 23 provides at one side thereof a vertical passage 24, the opposite ends of which are interconnected by an arcuate passageway 25 at the opposite side of the segment. A light sponge rubber ball 6, of such size as to fit closely but not tightly between the vertically disposed cord wires 4 and the grooved margin of the segment 23, when introduced into the passage 24 will climb from the bottom to the top thereof under influence of the constant vibration of the bow 2 and wires 4. The ball has sufficient contact pressure against the segment to maintain its operation relative with the vibrating wires 4. At its upper end the ball is deflected into the arcuate passage 25 and rolls by gravity back to the bottom of the vertical passage 24 for repetition of its climbing action.

For purpose of window display there is shown in Fig. 6 an embodiment of the present invention to be suspended from an overhead vibrator by which a plurality of spheres may be rotated simultaneously. Referring to Fig. 6, there is disclosed a ring 26 having therein a shelf 27 for support of an article of merchandise. Extending in opposite directions from the ring 26 are spring arms 28, each formed at its extremity with a horizontal circular loop 29. The resilient arms 28 may be variously shaped for ornamental design, and are free to vibrate.

Balls or spheres 6 are loosely supported on the terminal loops 29 of the spring arms. The entire assemblage is suspended by threads 30 from an overhead vibrator unit 31. In the drawings it is to be understood that Fig. 6a, illustrating the vibration unit, is but a continuation of Fig. 6, the intermediate portions of the supporting threads 30 being broken away. The vibrator unit comprises a block of wood within which is embedded and concealed from view, an electromagnet 32, and a vibrating armature 33. A hanger hook 34 attached to the vibrating armature projects beyond the block 31 for engagement with the supporting threads 30. The vibation of the arms 28 transmitted thereto through the suspension threads 30 from the overhead unit 31 effects simultaneous rotation of the balls 6 in opposite directions. Such balls if provided with reflecting facets or of different colors will attract attention to the merchandise displayed in the ring 26.

For animated sign purpose the revoluble elements are confined in supports or frames of letter or other character contour. As an illustration there is shown in Fig. 7 a series of letters 35 supported upon the vibratory cord wires 4—4 of the motion transmitting unit. These letters are formed from bulbous glass tubing, of which an enlarged view is shown in Fig. 8. The glass tubes shaped to form letters and characters are contracted at spaced intervals to afford reduced necks 36 interconnecting succeeding bulbs or chambers 37. Loosely confined within the bulbs or chambers 37 are small colored balls 38. These balls may be of sponge rubber, sufficiently flexible to be passed through the necks 35 from one chamber into another while under compression.

With such a ball in each chamber, different areas of the balls being of different color, their simultaneous rotation under influence of the transmitted vibrations is such as to readily attract attention thereto. As an alternative construction, flat discs 39 may be employed in channel shaped frames 40, contoured in the outline of letters, figures and characters as shown in Fig. 9. Such letters or characters may be supported on a table top or flat panel 41 which in turn is supported on the vibratory unit and subject to vibration thereby. To an observer such table top or flat support 41 appears to be at rest and conceals the vibrating unit therebeneath. The loose discs confined in the letter frames are maintained in slightly spaced relation by spaced pins 42 across the frame channels and are simultaneously rotated. In a device of this character one cent copper coins have been used as rotating discs, performing their rotary action without visible impelling means. Thus the use of coins forestalled any supposition of motive means within the ball and rendered the rotary action of the coins even more baffling and mysterious.

It being recognized that an inventor need not explain, or even know the principle of operation of his apparatus, it is to be understood that any statements of theory of operation herein, whether correct or incorrect, are not to be deemed as limitations. It is believed that alternate unidirectional impulses transmitted to the actuated body below its center of mass imparts to the body sufficient momentum to resist the influence of alternate impulses in the opposite direction and before the inertia of the body is overcome by such reverse impulse aided by gravity, in the case of the inclined or vertical travel path, the body receives its succeeding motivating impulse. The reverse impulse having been absorbed overcoming the momentum or inertia resulting from the preceding motivating impulse, the body is again in a balanced or "zero" condition to respond to the succeeding actuating impulse by which another slight movement with resulting momentum is effected.

The upward diagonal unidirectional alternate impulses delivered to the movable body below its center of mass in opposition to gravity influence momentarily overcome the influence of gravity and slightly raise the body, thereby relaxing the frictional engagement thereof with its support and at the same time impart thereto glancing or off-center impulses which tend to move the body while frictional resistance of its engagement with its support is relieved. Upon the reverse alternate impulses of the support the body, relieved of the lifting influence of the upwardly diagonal impulses, settles to its support under gravity but in a slightly different position and its inertia plus the frictional resistance of its engagement with its support resists return movement.

By varying the relation of the electro-magnet to the vibratory spring element, which acts as an armature, the character and amplitude of the vibratory impulses may be varied and regulated. To this end the magnet 5 is preferably, although not necessarily, axially adjustable within the support.

To minimize noise as well as increase the frictional engagement of the support with the movable body, the wires 4 and loops 20 and 29 are preferably covered with rubber or slightly tenacious cushion material. The supports may be dipped in rubber solution, which is then vulcanized or solidified thereon. While a number of different embodiments of the invention are illustrated, many more will readily occur to one demonstrating the apparatus. In lieu of letter and character frames, the letters and characters of an animated sign may be outlined on a common panel or background and the rotary elements mounted on the common panel within the letter and character outlines and the entire structure subjected to vibration, by which simultaneous rotary motion is transmitted to the rotary elements.

The present motion translating means has possibility of wide application to animated toys, as for example, wherein several figures of racing animals are positioned on a vibratory table top such as shown at 41 in Fig. 9 and by the vibratory action caused to travel thereon, in quite the same manner that the ball 6 travels on the track 4 of Fig. 1. Also, several tracks 4 may be placed side by side and figures other than balls be made to travel thereon. In lieu of the ball, a figure of a tight-rope walker may be substituted. Likewise, the rotary motion may be utilized for actuating other toy figures, as for example a clown in a rotating hoop.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In a motion transmitting apparatus, a bow spring, a support therefor, a track for a freely movable ball connecting the ends of the bow spring in inclined relation to the horizontal, a ball loosely resting upon the track, and vibration transmitting means for imparting vibratory impulses to the bow spring in a direction inclined to the lineal direction of the track, the construction and arrangement being such that the ball is responsive to alternate vibration impulses only in one direction by which the ball is propelled along the track in one direction and is returned by gravity in the opposite direction to the lower end of the track for repetition of its cycle of movement.

2. In a motion transmitting apparatus, a bow spring, a support therefor, a track for a freely movable body connecting the ends of the bow spring in angularly disposed relation to the horizontal, a movable body loosely engaging the track, and electro-magnetic means for transmitting a continuous succession of vibratory impulses to the bow spring in a direction inclined to the lineal extent of the track, the construction and arrangement being such that the movable body is responsive to alternate vibrations only in one direction by which the movable body is propelled along the track in one direction, the body being returned by gravity to the initial portion of the track for repetition of its cycle of movement.

3. In a motion transmitting apparatus, a bow spring, a support therefor, a substantially vertically disposed track interconnecting the ends of the bow spring, a guide member disposed in parallel relation with the track, a return passage for the ball connecting the opposite ends of the track disposed at the opposite side of the guide, a ball loosely resting against said track intermediate the track and guide, and vibration transmitting means for imparting vibratory impulses to the bow spring in a direction inclined to the lineal extent of the track, the construction and arrangement being such that the ball is caused to climb along the track intermediate the track and guide and is returned thence by gravity from the upper to the lower end of the track through said return passage.

4. In a motion transmitting apparatus, a vibratory spring member, a support therefor, a rest for a rotary ball carried by the vibratory spring member, a ball loosely resting thereon, and electromagnetic means for imparting to the vibratory spring member a succession of vibrations in a direction inclined to the horizontal, the construction and arrangement being such that the ball is responsive to vibratory impulses in one direction only and is rotated by the influence thereof.

5. In a motion transmitting apparatus, a dependent arcuate vibratory spring member, a support therefor, a support for a rotary ball carried by the spring member, a ball loosely seated on the support and free to rotate relative thereto, and electromagnetic means for imparting vibratory motion to the spring member in a direction angular to the perpendicular, the construction and arrangement being such that the ball is responsive to vibrations in one direction only and is actuated through rotary motion thereby.

6. In a motion transmitting apparatus, a hanger member, a vibratory arm carried thereby, a vibratory suspension member from which the hanger is suspended, a support for a movable body carried by the vibratory arm, a movable body resting thereon for relative bodily motion, means for transmitting a succession of vibrations from the suspension member to the vibratory arm in a direction angular to the perpendicular, the construction and arrangement being such that the movable body is responsive to vibrations in one direction only and is actuated through relative motion thereby.

7. In a motion transmitting means, a plurality of rotary elements, a holder therefor having the outline of a letter or character in which the rotary elements are confined for independent unison rotation, a vibratory support for the holder, and means for transmitting to the support a succession of vibrations in a direction angular to the perpendicular, the construction and arrangement being such that the plurality of rotary elements are responsive only to vibrations in one direction and are simultaneously actuated thereby through unison rotary motions.

8. In an apparatus of the character described, a vibratory spring member, a movable body loosely resting thereon at a point below its center of mass, and vibration generating means including a vibration transmitter inclined to the perpendicular for imparting vibratory impulses to said vibratory spring member in such direction that the body is responsive to alternate impulses only transmitted in the same direction by which the body is actuated through a continuing path of movement.

9. The herein described method of producing an animated sign, including providing a plurality of letters or characters, mounting on each a plurality of rotary elements supported below their centers of mass, supporting the letters or characters upon a vibratory support and transmitting to the rotary elements at a point below their center of mass a succession of vibratory impulses in a direction inclined to the perpendicular, of unidirectional impulses to which the rotary elements are responsive.

WALTER P. NIBLICK.